United States Patent
Prakash et al.

(10) Patent No.: US 11,231,732 B1
(45) Date of Patent: Jan. 25, 2022

(54) PRE-CHARGE MANAGEMENT FOR POWER-MANAGED VOLTAGE REFERENCES

(71) Applicant: CIRRUS LOGIC INTERNATIONAL SEMICONDUCTOR, LTD., Edinburgh (GB)

(72) Inventors: Chandra Prakash, Austin, TX (US); Prashanth Drakshapalli, Austin, TX (US)

(73) Assignee: CIRRUS LOGIC, INC., Austin, TX (US)

(*) Notice: Subject to any disclaimer, the term of this patent is extended or adjusted under 35 U.S.C. 154(b) by 42 days.

(21) Appl. No.: 16/922,654

(22) Filed: Jul. 7, 2020

(51) Int. Cl.
 G05F 1/46 (2006.01)
 H02J 7/34 (2006.01)

(52) U.S. Cl.
 CPC .............. *G05F 1/468* (2013.01); *H02J 7/345* (2013.01)

(58) Field of Classification Search
 CPC ................................. G05F 1/468; H02J 7/345
 See application file for complete search history.

(56) References Cited

U.S. PATENT DOCUMENTS

| | | | | |
|---|---|---|---|---|
| 6,011,429 A * | 1/2000 | Oda | ........................ | G05F 1/468 327/545 |
| 6,670,902 B1 | 12/2003 | Melanson et al. | | |
| 6,707,340 B1 * | 3/2004 | Gough | ..................... | H03F 1/083 323/273 |
| 2015/0035505 A1 * | 2/2015 | Peluso | ..................... | G05F 1/465 323/273 |
| 2015/0309518 A1 * | 10/2015 | Nagda | ..................... | H02M 3/07 323/274 |
| 2018/0152174 A1 | 5/2018 | Zanbaghi et al. | | |

\* cited by examiner

*Primary Examiner* — Kyle J Moody
*Assistant Examiner* — Lakaisha Jackson
(74) *Attorney, Agent, or Firm* — Mitch Harris, Atty at Law, LLC; Andrew M. Harris

(57) ABSTRACT

A power managed voltage reference quickly provides accurate operation when enabled and also avoids back-charging power supply rails when disabled. When disabled, the voltage reference filter capacitor is decoupled from the voltage reference buffer and coupled to a pre-charge source having a voltage magnitude greater than the reference voltage. When the voltage reference is enabled, the capacitor is coupled to a discharge path and the voltage across the capacitor is detected to determine when to decouple the capacitor from the discharge path and couple the capacitor to the voltage reference buffer. The capacitor voltage is also detected while disabling the voltage reference. Back-charging the pre-charge supply is prevented by coupling the capacitor to the discharge path until the magnitude of the capacitor voltage is less than the lowest voltage specified for the pre-charge supply, then coupling the capacitor to the pre-charge supply to prepare for enabling the voltage reference.

24 Claims, 7 Drawing Sheets

PRE-CHARGE MANAGEMENT FOR POWER-MANAGED VOLTAGE REFERENCES

BACKGROUND

1. Field of Disclosure

The field of representative embodiments of this disclosure relates to methods and circuits that reduce error and prevent power supply back-feed when a voltage reference enters and exits a low-power or disabled state.

2. Background

Voltage references are needed in a wide range of circuit applications, particularly in data converters such as analog-to-digital converters (ADCs), digital-to-analog converters (DACs), and other circuits in which comparison of a voltage level to a precision reference is performed. ADC circuits for remote sensing and other battery-operated applications in which measurements are needed only periodically, generally require a power-down or other low power state in order to reduce battery drain when measurements are not being performed. The voltage reference buffer amplifier is typically a relatively high power consumption device, since they are typically implemented as non-inverting buffers and the feedback network must be low impedance in order to minimize thermal noise. Further, the lower the current levels in the amplifier used to implement the buffer, the greater the impact of current noise on the output voltage of the reference. Therefore, a precision voltage reference circuit is typically a significant battery energy consumer and must be power-managed along with other circuits.

A typical voltage reference includes an output filtered by a resistor-capacitor (RC) low-pass filter that filters noise from both the original reference source, such as a bandgap or Zener reference, and from the voltage reference buffer. The filter has a very low frequency pole, which increases noise reduction, but also increases the settling time of the voltage reference output. In some applications, the voltage reference output must be available within a time period much less than the settling time of the RC filter. Therefore, when activating a voltage reference that has been in a power-down state, a "wait" time must typically be provided before the voltage at the output of the voltage reference can be used in a comparison. This wait time is generally dominated by the charging time of the capacitor at the output of the voltage reference. Otherwise, any resulting output will have an error directly related to the allowable delay of the measurement. However, even with a wait time that allows for charging the output capacitor, additional time compensating for parasitic effects due to dielectric absorption must be included in the wait time that is needed before the output of the voltage reference can be used for detection or measurement.

Referring to FIG. 1A, an illustration of a model of a voltage reference filter capacitor $C_{FILT}$ that includes the effect of dielectric absorption is shown. The actual filter capacitance is modeled as capacitor $C_F$ and a parallel RC (resistor-capacitor) network formed by capacitor $C_{par}$ and $R_{par}$ is connected in series with capacitor $C_F$. The leakage of the filter capacitor is modeled by resistor $R_{Leak}$. Even if it were possible to instantaneously charge the voltage reference filter capacitor $C_{FILT}$ modeled by the circuit in FIG. 2A, the portion of the total voltage that is present on capacitor $C_{par}$ discharges through resistor $R_{par}$ once the charging voltage source is removed. The "droop" that occurs is shown in FIG. 1B occurs after capacitor $C_{FILT}$ is charged and then open-circuited and represents a change in voltage $\Delta V = V_{DROOP}$, which in a physical sense represents a memory of the dielectric material, i.e., the property of the dielectric which prevents the dielectric from completely giving up an "absorbed" charge. The illustrated voltage droop is orders of magnitude faster than the discharge that is due to dielectric leakage, which is modeled by $R_{Leak}$. Since the time constant of the parallel combination of $C_{par}$ and $R_{par}$ may be on the order of milliseconds, dielectric absorption may prevent obtaining an accurate ADC measurement within a specified start-up and conversion time. Thus, any short duration pulse charging the voltage reference filter capacitor will result in an error once the voltage across the $C_{par}$ and $R_{par}$ has become sufficiently small. Therefore, circuits have been implemented to reduce the wait time on startup of a voltage reference, such as shorting the resistance portion of the RC filter with a lower resistance, which introduces a pole that can be tuned to cancel the zero provided by the parallel combination of $C_{par}$ and $R_{par}$. The disadvantage of shorting the resistance portion of the RC filter is that bandgap and buffer noise are integrated on the filter cap, instead of being removed by the RC filter, introducing a source of error that may be unacceptable.

Another solution that has been implemented is to pre-charge the voltage reference filter capacitor to a voltage that is close to that of the voltage reference output during operation from an available power supply rail, which also has disadvantages. A first disadvantage is that the voltage on the voltage reference filter capacitor when the voltage reference buffer amplifier is disabled may exceed the reference voltage. Therefore, the voltage reference buffer amplifier would be initially required to sink current when the voltage reference is first enabled, requiring a more complicated buffer amplifier that increases power consumption during operation and area required on the IC die. A second disadvantage is that when the voltage reference is disabled, the voltage on the voltage reference filter capacitor may exceed the power supply rail from which the pre-charge voltage is provided, causing back-feed of current into other circuits, which can cause improper operation, latch-up and other unacceptable system behavior.

Therefore, it would be advantageous to reduce the power-up wait time of a voltage reference when the voltage reference is first enabled, while requiring only a single-ended (Class A) reference buffer, and while preventing back-feed of the voltage reference filter capacitor voltage to other circuits when the voltage reference is disabled.

SUMMARY

Improved voltage reference operation is accomplished in voltage reference circuits and their methods of operation.

The voltage reference circuit includes a voltage reference source that is buffered by a voltage reference buffer. The output of the voltage reference buffer is filtered by a voltage reference filter capacitor. The voltage reference buffer operates in a normal power state and has a selectable low power state. A comparator compares a voltage across the voltage reference filter capacitor to a threshold voltage and controls a switching circuit that selectively couples a first terminal of the voltage reference filter capacitor to a pre-charge source when the low power state is selected. The second terminal of the voltage reference filter capacitor is coupled to a return current path, e.g., ground. When the voltage reference transitions from the low power state to the normal power state, the switching circuit decouples the pre-charge source from the first terminal of the voltage reference filter capacitor and couples the first terminal of the voltage reference filter capacitor to a discharge path, to reduce the voltage on the voltage reference filter capacitor that would otherwise require the voltage reference buffer to sink current when connected. When the comparator indicates that a magnitude of the voltage across the voltage reference filter capacitor is less than a threshold voltage, the switching circuit couples the voltage reference buffer to the first terminal of the voltage reference filter capacitor. The first terminal of the voltage reference filter capacitor may be coupled directly to the output of the voltage reference buffer, or to the output of the reference voltage source that provides the input to the voltage reference buffer.

When the voltage reference transitions from the normal power state to the low power state, the switching circuit may decouple the first terminal of the voltage reference filter capacitor from the voltage reference buffer and couple the first terminal of the voltage reference filter capacitor again to the discharge path and then to the power supply to pre-charge the voltage reference filter capacitor, once the comparator indicates that that the magnitude of the voltage across the voltage reference filter capacitor is less than the threshold voltage, preventing back-feed of current from the voltage reference filter capacitor to the power supply.

The summary above is provided for brief explanation and does not restrict the scope of the claims. The description below sets forth example embodiments according to this disclosure. Further embodiments and implementations will be apparent to those having ordinary skill in the art. Persons having ordinary skill in the art will recognize that various equivalent techniques may be applied in lieu of, or in conjunction with, the embodiments discussed below, and all such equivalents are encompassed by the present disclosure.

DETAILED DESCRIPTION OF ILLUSTRATIVE EMBODIMENT

The present disclosure encompasses voltage reference circuits and methods that provide fast startup in a precision voltage reference circuit, such as those used in delta-sigma analog-to-digital converters (ADCs). While the voltage reference circuit is in a low-power or powered-down condition in which the voltage reference buffer is disabled, the voltage reference filter capacitor is charged via a pre-charge circuit to a voltage close to the voltage reference output voltage, then discharged to a predetermined voltage equal to the threshold voltage of a comparator that compares the threshold voltage to the voltage across the voltage reference filter capacitor. The comparator signals a switch control logic to terminate the discharge and connect the voltage reference buffer to the voltage reference filter capacitor, so that the change in voltage required to charge the voltage reference filter capacitor to the target voltage of the voltage reference is reduced, resulting in a reduction of the above-described voltage droop, which is proportional to the step size in voltage across the voltage reference filter capacitor when the voltage reference is enabled.

Figure 2:
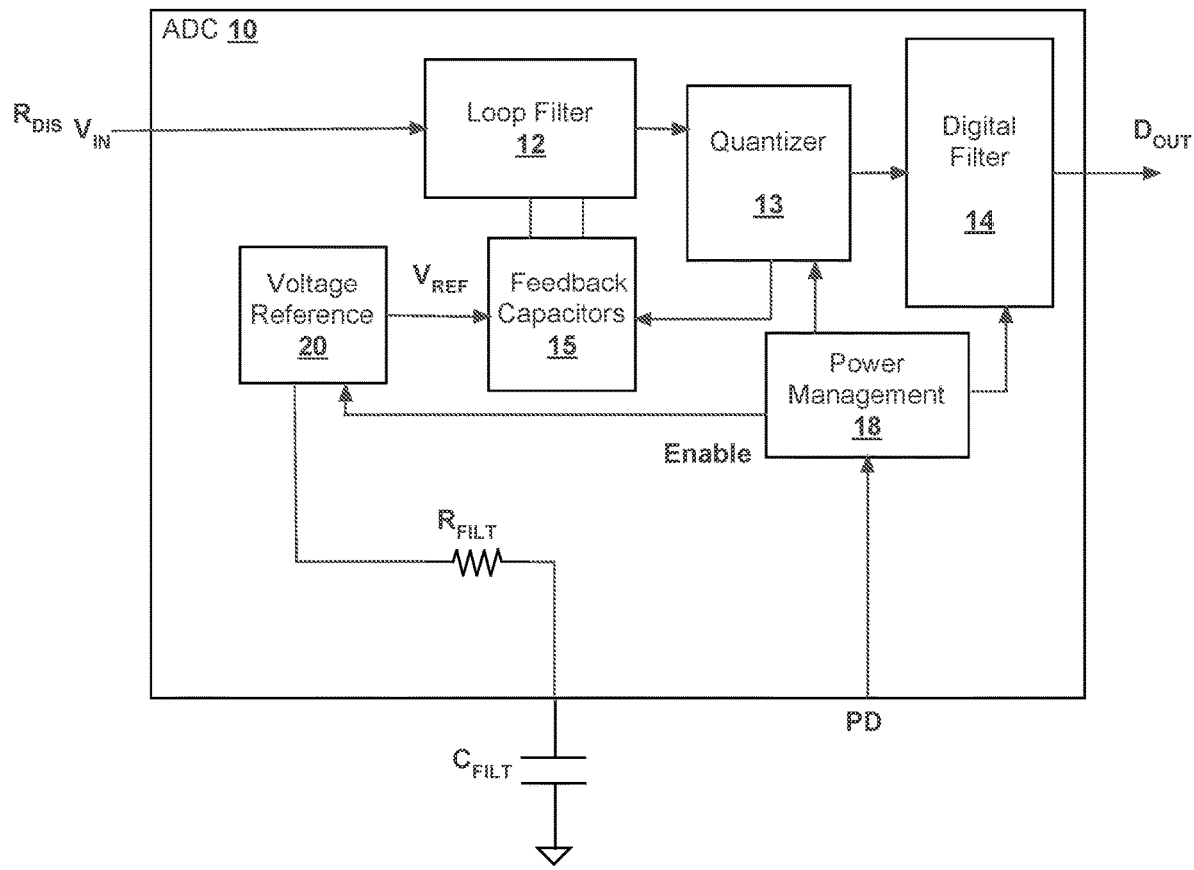
FIG. 2 is an example block diagram of an analog-to-digital converter (ADC) incorporating a voltage reference circuit 20, in accordance with an embodiment of the disclosure.

Referring now to FIG. 2, an example of a delta-sigma ADC integrated circuit 10 is shown that incorporates a voltage reference circuit 20, in accordance with an embodiment of the disclosure. Voltage reference circuit 20 is connected by a filter resistor $R_{FILT}$ to a voltage reference filter capacitor $C_{FILT}$, which is connected to an external terminal pin of ADC integrated circuit 10. Filter resistor $R_{FILT}$ may be a switched-capacitor resistor implementation. Filter resistor $R_{FILT}$ forms an RC low-pass filter with $C_{FILT}$. While voltage reference filter capacitor $C_{FILT}$ is an external capacitor as described and illustrated herein, external connection is not a limitation of the present disclosure, and the embodiments of the present disclosure should be considered as applying to voltage references with internally-formed filter capacitors. As will be described in further detail below, filter resistor $R_{FILT}$ may couple voltage reference filter capacitor $C_{FILT}$ directly to the output of voltage reference circuit 20, or may couple voltage reference filter capacitor $C_{FILT}$ to an internal reference voltage source node of voltage reference circuit 20 that is buffered to provide the output of voltage reference circuit 20. An input voltage $V_{IN}$ is received by an analog loop filter 12 that integrates input voltage $V_{IN}$ to generate an output supplied to an input of a quantizer 13 that generates a digital input that is filtered by a digital filter 14 to generate the output $D_{OUT}$ of ADC integrated circuit 10. A feedback capacitor bank 15 is selectively operated by an output of quantizer 13 to apply a reference voltage to loop filter 12 to complete the delta-sigma converter loop. Voltage reference 20 supplies reference voltage $V_{REF}$ to feedback capacitors 15. A power management block 18, responsive to an external power down control signal PD, de-asserts a control signal Enable, to place voltage reference 20 in a power-down state. When external power down control signal PD is de-asserted, power management block 18 asserts control signal Enable to restore voltage reference 20 to an operational (normal power) state. Details of the transition into and out of a power-managed state (e.g., power-down or low-power) will be described in further detail below.

Figure 3:
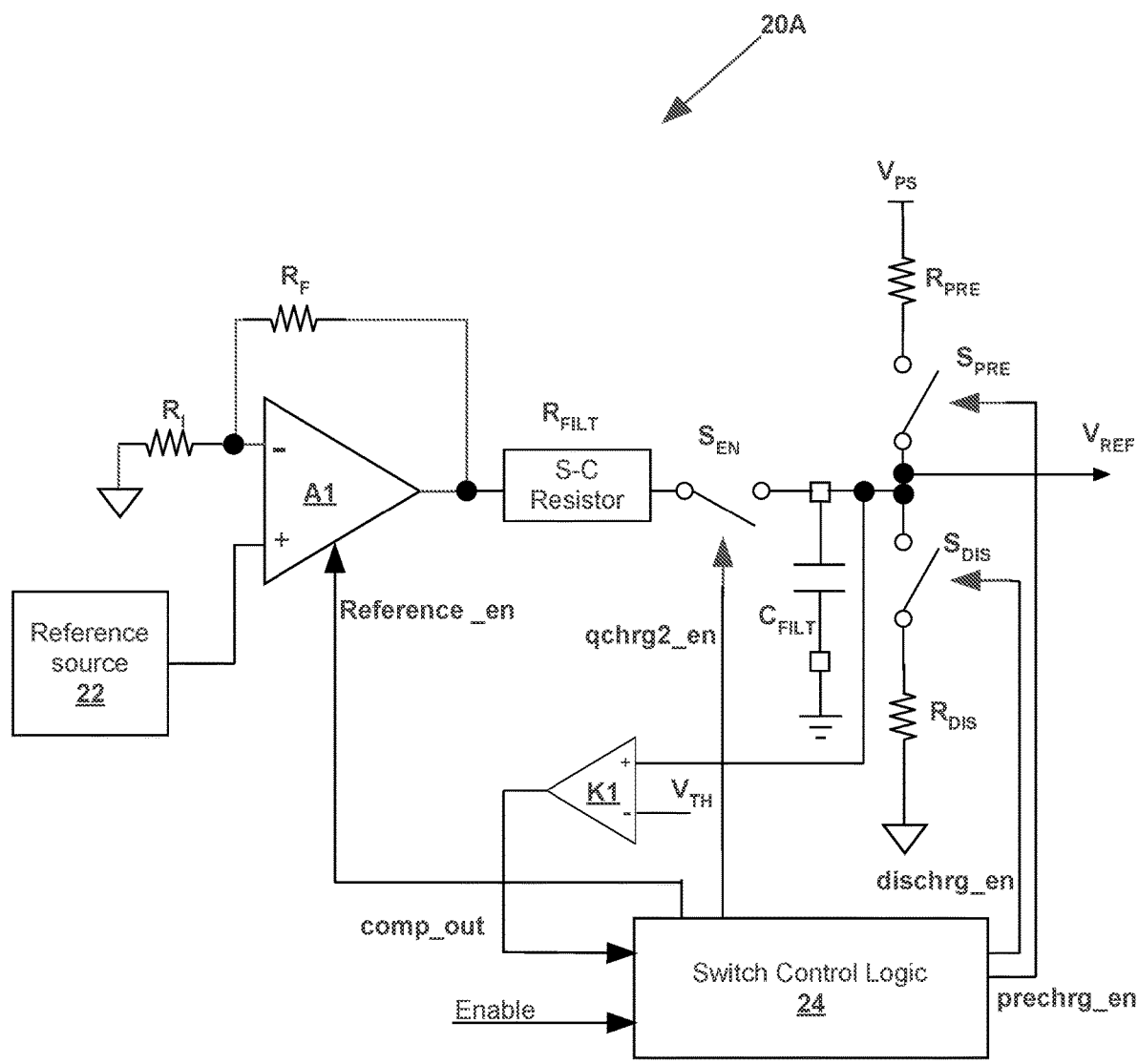
FIG. 3 is an example schematic diagram showing details of voltage reference circuit 20, in accordance with an embodiment of the disclosure.

Referring now to FIG. 3, details of an example voltage reference 20A that may be used to implement voltage reference 20 of FIG. 2, are shown in a schematic diagram, in accordance with an embodiment of the disclosure. Voltage reference 20A includes a reference buffer amplifier A1, which is generally a class-A operational transconductance amplifier (OTA) configured as a buffer by an input resistor $R_I$ and a feedback resistor $R_F$ which may be equal resistance to form a unity-gain buffer, or may set an alternative gain value. A reference source 22 provides the input to the unity-gain buffer supplied by reference buffer amplifier A1 and may be a band-gap, Zener or other suitable precision reference voltage source. A control signal Reference_en is provided to an enable input of reference buffer amplifier A1, which places reference buffer amplifier A1 in a disabled state when a switch control logic 24 receives a power-down indication when control signal Enable at the input of switch control logic 24 is de-asserted. A filter resistor $R_{FILT}$ is coupled to the output of reference buffer amplifier A1. Filter resistor $R_{FILT}$ is selectively coupled to voltage reference filter capacitor $C_{FILT}$ according to a control signal qchrg2_en that controls a switch $S_{EN}$. Switch $S_{EN}$ is part of a switching circuit that also includes a switch $S_{PRE}$ that selectively couples voltage reference filter capacitor $C_{FILT}$ to a pre-charge source $V_{PS}$, which is generally a power supply rail that is available when ADC integrated circuit 10 is in the power-down state. Pre-charge source $V_{PS}$ has a voltage close to the target output voltage $V_{REF}$ of voltage reference 20A. Thus, the pre-charge voltage to which voltage reference filter capacitor $C_{FILT}$ is charged while voltage reference 20A is disabled is close to the target voltage of output voltage $V_{REF}$ of voltage reference 20A. A resistor $R_{DIS}$ is selectively coupled via a switch $S_{DIS}$, which forms another part of the above-mentioned switching circuit, to voltage reference filter capacitor $C_{FILT}$ in order to repeatably, or on demand, discharge voltage reference filter capacitor $C_{FILT}$ to the target voltage or other suitable voltage. The voltage to which voltage reference filter capacitor $C_{FILT}$ is charged is determined by a threshold voltage $V_{TH}$ that sets a trip point of a comparator K1 that supplies a control signal comp_out to switch control logic 24. In addition to the above-described enable sequence, the discharge path through switch $S_{DIS}$ is again used when reference buffer amplifier A1 is disabled, to prevent the voltage on voltage reference filter capacitor CHET from back-feeding other circuits when voltage reference circuit 20A enters the pre-charge phase of operation while reference buffer amplifier A1 is disabled and de-coupled from voltage reference filter capacitor $C_{FILT}$.

Figure 1A:
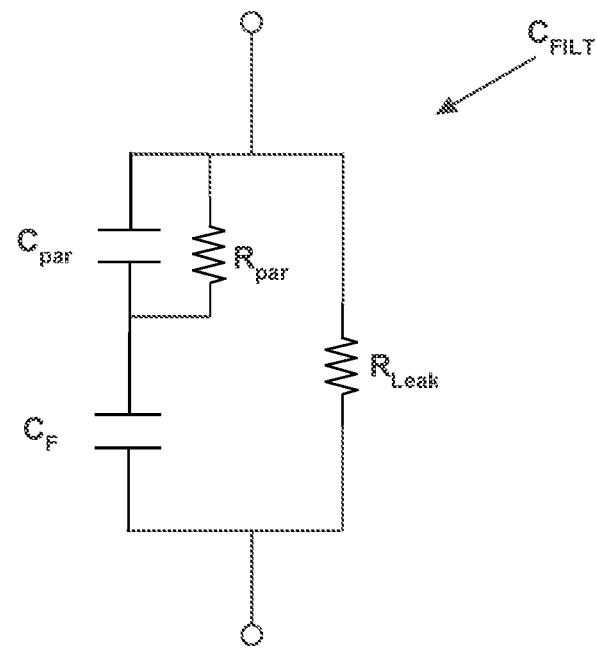
FIG. 1A is an example schematic drawing showing a model of a capacitor $C_{FILT}$ as used in the circuits described below in accordance with embodiments of the disclosure.
Figure 1B:
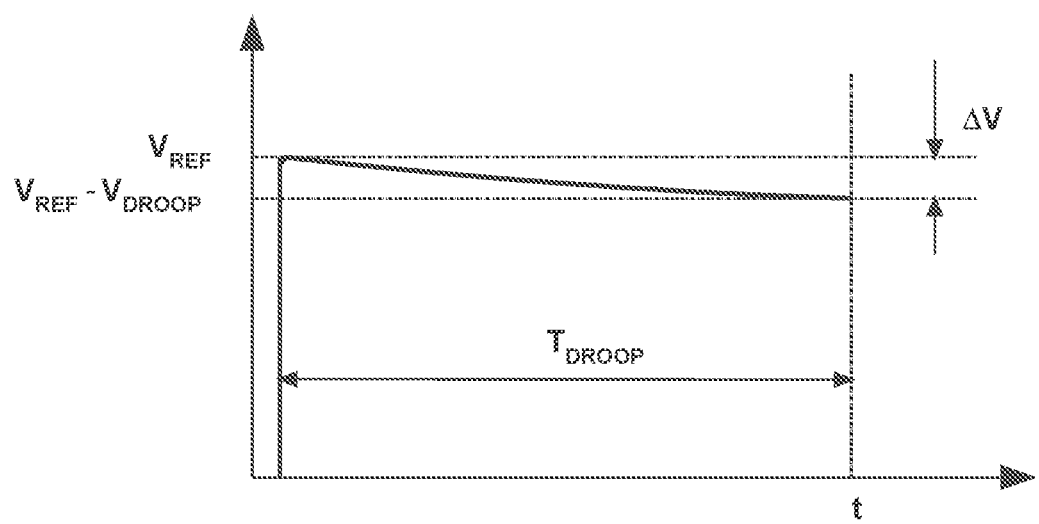
FIG. 1B is an example graph illustrating a voltage droop behavior of capacitor $C_{FILT}$ when open-circuited after being charged.
Figure 4:
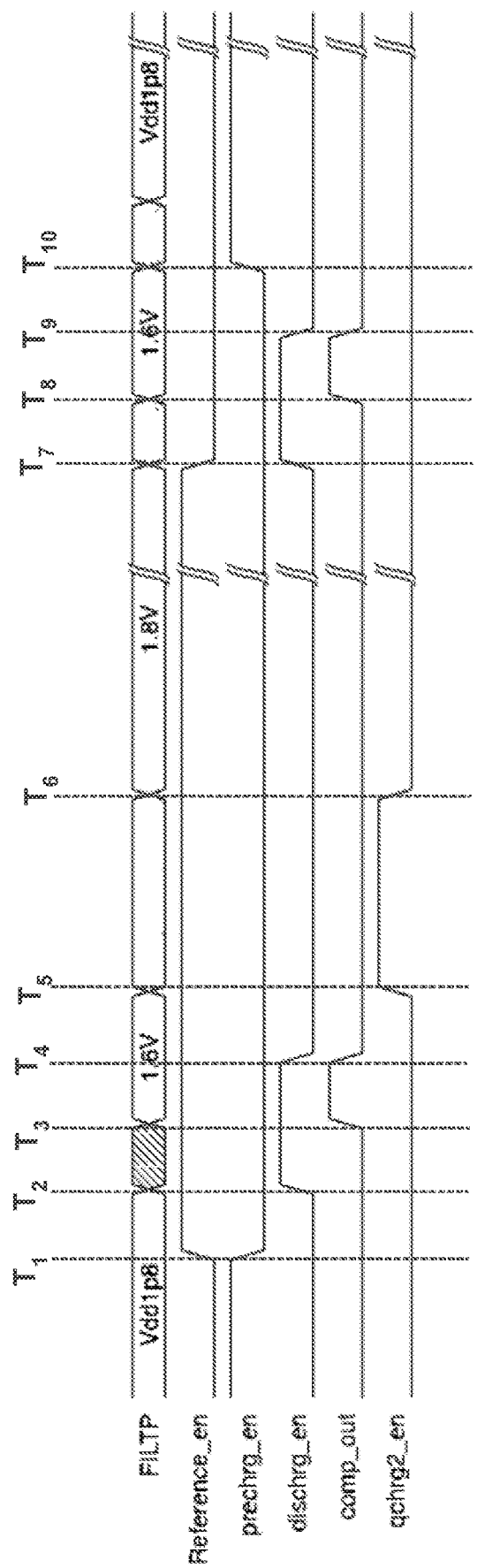
FIG. 4 is an example timing diagram illustrating operation of voltage reference circuit 20, in accordance with an embodiment of the disclosure.
Figure 5A:
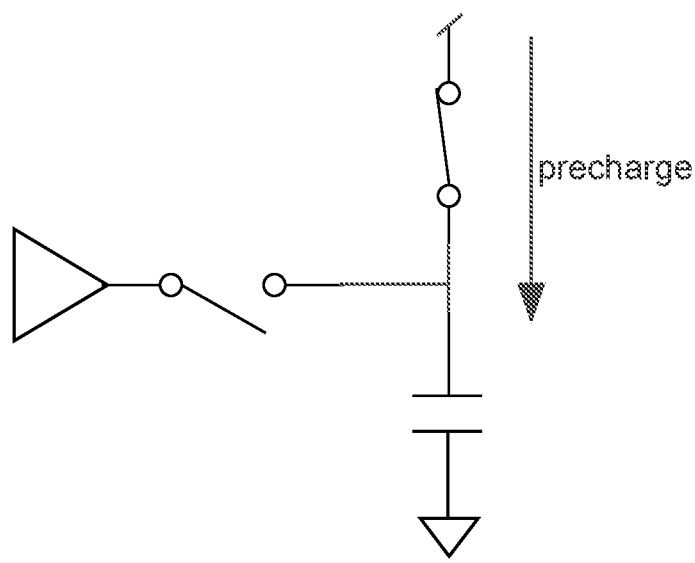
FIGS. 5A-5C are example simplified schematic diagrams illustrating operation of voltage reference circuit 20, in accordance with an embodiment of the disclosure.
Figure 5B:
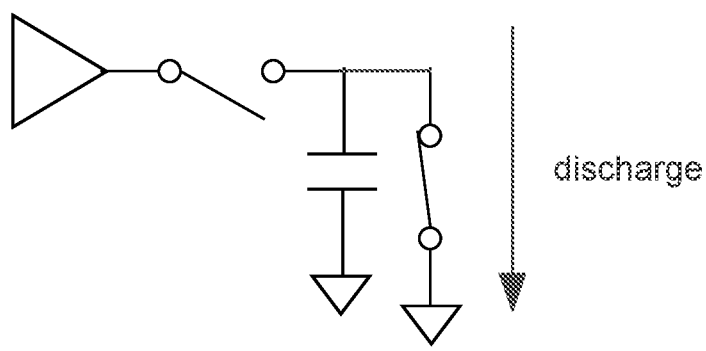
Figure 5C:
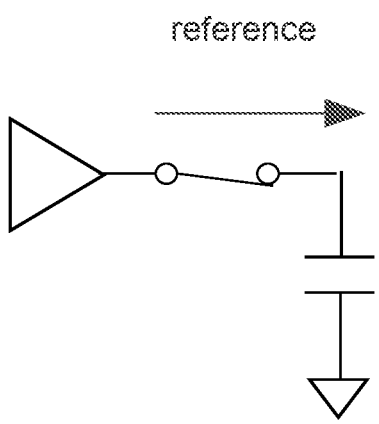

Referring additionally to FIG. 4 and to FIGS. 5A-5C, the sequence of operations in example voltage reference circuit 20A of FIG. 3 is illustrated. The timing diagram of FIG. 4 illustrates a synchronous (clocked) control logic that implements switch control logic 24 in one example, but this disclosure is not limited to synchronous control, which is shown for the convenience of preventing switch overlap and clear illustration of the various states of the switches in voltage reference 20A as illustrated in FIG. 3, and which are simplified in FIGS. 5A-5C. While voltage reference circuit 20A is in the disabled/power-down state, a pre-charge phase of operation is maintained, with switch $S_{PRE}$ enabled as illustrated by FIG. 5A, to charge voltage reference filter capacitor $C_{FILT}$ to the voltage of power supply $V_{PS}$ as illustrated in FIG. 3. As illustrated in FIG. 4, at time $T_1$, control signal Reference_en is asserted to enable reference buffer amplifier A1 and control signal prechrg_en is de-asserted to disconnect the pre-charge voltage source from voltage reference filter capacitor $C_{FILT}$ by opening switch $S_{PRE}$, which represents the transition between the pre-charge and discharge phases illustrated in FIG. 5A and FIG. 5B, respectively. Next, at time $T_2$, control signal dischrg_en is asserted to close switch $S_{DIS}$ to reduce the magnitude of the voltage on voltage reference filter capacitor $C_{FILT}$ (shown as the value in FILTP in FIG. 4) from Vdd1p8, which is an example (1.8V) of the voltage of $V_{PS}$ in FIG. 3 to an example value of 1.6V at time $T_3$, which is the discharge phase illustrated in FIG. 5B. When the voltage across voltage reference filter capacitor $C_{FILT}$ falls at time $T_3$, to the 1.6V, which is the example target voltage determined by threshold voltage $V_{TH}$=1.6V, the state of the output comp_out of comparator K1 changes, causing the discharge period to end at time $T_4$ by de-asserting control signal dischrg_en. At time $T_5$, control signal qchrg2_en is asserted, which couples the output of reference buffer amplifier A1 through resistor $R_{FILT}$ to voltage reference filter capacitor $C_{FILT}$ as illustrated in the reference phase shown in FIG. 5C, and which charges voltage reference filter capacitor $C_{FILT}$ to reference voltage $V_{REF}$. At time $T_6$, control signal qchrg2_en is de-asserted, disconnecting reference buffer amplifier A1 from voltage reference filter capacitor $C_{FILT}$, so that voltage reference filter capacitor $C_{FILT}$ can be applied as a reference to the feedback capacitors 15 (FIG. 1).

After voltage reference filter capacitor $C_{FILT}$ has been applied to the reference in ADC integrated circuit 10, it is necessary to pre-charge voltage reference filter capacitor $C_{FILT}$ again, or disable voltage reference 20, depending on the next operation to be performed. The right-hand side of FIG. 4 illustrates a power-down sequence, in which at time $T_7$, control signal Reference_en is de-asserted to disable reference buffer amplifier A1 and control signal discharge_en is asserted to begin another discharge phase as illustrated in FIG. 5B. The discharge phase discharges voltage reference filter capacitor $C_{FILT}$ to a voltage lower than the lowest specified voltage of power supply rail $V_{PS}$, so that voltage reference filter capacitor $C_{FILT}$ cannot back-feed power supply rail $V_{PS}$ when the pre-charge phase is entered again. At time $T_8$, comparator K1 detects that the voltage across voltage reference filter capacitor $C_{FILT}$ has fallen below $V_{TH}$, asserting control signal comp_out, which then causes switch control logic 24 to de-assert control signal dischrg_en at time $T_9$ and then assert control signal prechrg_en at time $T_{10}$. Assertion of prechrg_en starts another pre-charge phase as illustrated in FIG. 5A which then begins pre-charge of voltage reference filter capacitor $C_{FILT}$ to the voltage of power supply $V_{PS}$ (1.8V), so that until the next conversion is initiated, voltage reference circuit 20A remains in the power-down state.

Figure 6:
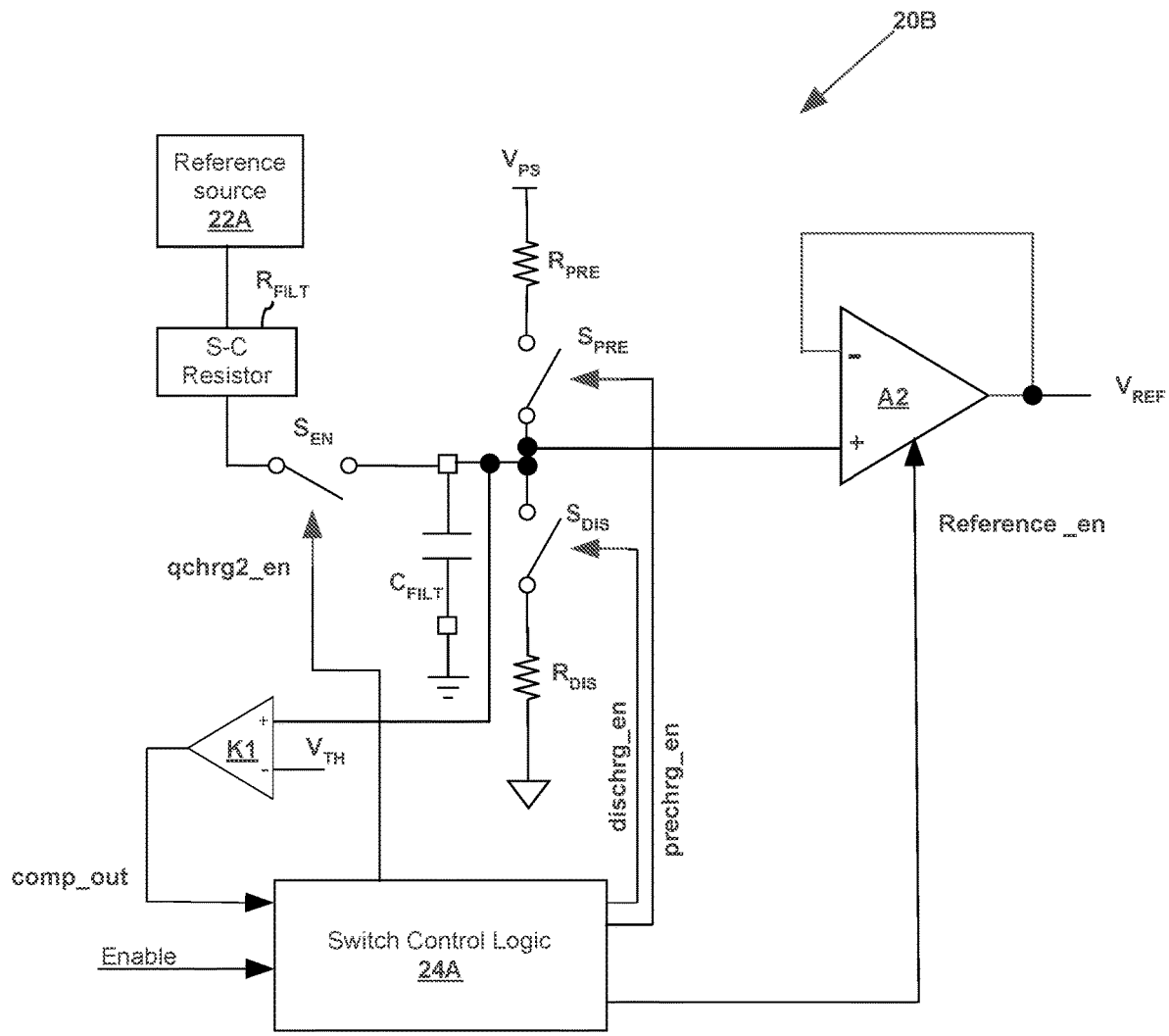
FIG. 6 is an example schematic diagram showing details of voltage reference circuit 20A, in accordance with another embodiment of the disclosure.

Referring now to FIG. 6, details of another example voltage reference 20B are shown in a schematic diagram, in accordance with another embodiment of the disclosure and as may be used to implement voltage reference 20 of FIG. 2. Voltage reference 20B is similar to voltage reference 20A of FIG. 3, so only differences between them will be described below. Voltage reference 20B includes a reference buffer amplifier A2, which is generally a class-A operational transconductance amplifier (OTA) configured as a unity-gain buffer. A reference source 22A provides the reference voltage which is filtered by filter resistor $R_{FILT}$ and voltage reference filter capacitor $C_{FILT}$ to provide the filtered reference voltage, which is applied to the input of the unity-gain buffer supplied by reference buffer amplifier A2, which in turn generates voltage reference output $V_{REF}$. Filter resistor $R_{FILT}$ may be a switched-capacitor resistor implementation, as mentioned above with respect to the embodiment of FIG. 3. Reference source 22A may be a band-gap, Zener or other suitable precision reference voltage source. As in voltage reference 20A of FIG. 3, a control signal Reference_en is provided to an enable input of reference buffer amplifier A2, which places reference buffer amplifier A2 in a disabled state when a switch control logic 24A receives a power-down indication when control signal Enable at the input of switch control logic 24A is de-asserted. Filter resistor $R_{FILT}$ is selectively coupled to voltage reference filter capacitor $C_{FILT}$ according to a control signal qchrg2_en that controls a switch $S_{EN}$. Switch $S_{EN}$ is part of a switching circuit that also includes a switch $S_{PRE}$ that selectively couples voltage reference filter capacitor $C_{FILT}$ to a pre-charge source $V_{PS}$, which is generally a power supply rail that is available when ADC integrated circuit 10 is in the power-down state. Pre-charge source $V_{PS}$ has a voltage close to the target output voltage $V_{REF}$ of voltage reference 20B. Thus, the pre-charge voltage to which voltage reference filter capacitor $C_{FILT}$ is charged while voltage reference 20B is disabled is close to the target voltage of output voltage $V_{REF}$ of voltage reference 20B. A resistor $R_{DIS}$ is selectively coupled via a switch $S_{DIS}$, which forms another part of the above-mentioned switching circuit, to voltage reference filter capacitor $C_{FILT}$ in order to repeatably discharge voltage reference filter capacitor $C_{FILT}$ to the target voltage or other suitable voltage. The voltage to which voltage reference filter capacitor $C_{FILT}$ is charged is determined by threshold voltage $V_{TH}$, which sets a trip point of a comparator K1. Comparator K1 that supplies control signal comp_out to switch control logic 24. In addition to the above-described enable sequence, the discharge path through switch $S_{DIS}$ is again used when reference buffer amplifier A2 is disabled, to prevent the voltage on voltage reference filter capacitor $C_{FILT}$ from back-feeding other circuits when voltage reference circuit 20B enters the pre-charge phase of operation.

Figure 7A:
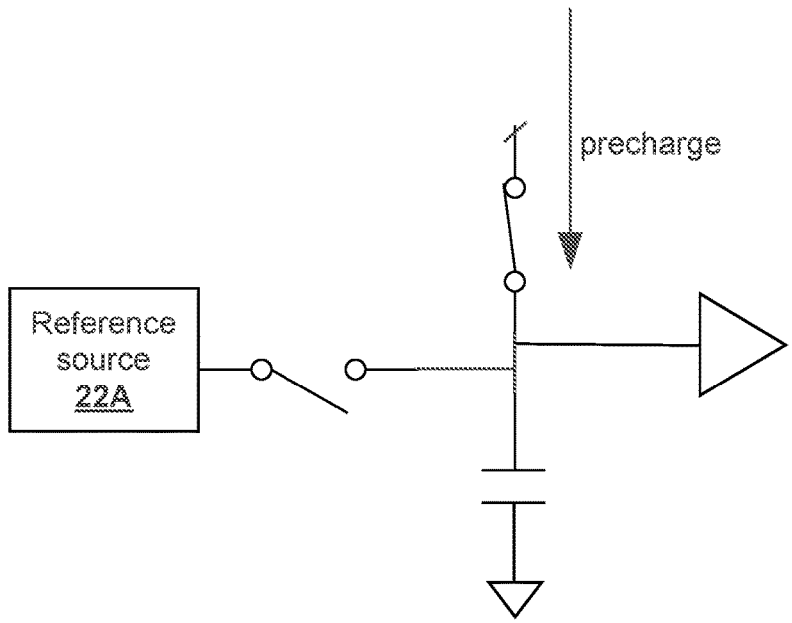
FIGS. 7A-7C are example simplified schematic diagrams illustrating operation of voltage reference circuit 20A, in accordance with an embodiment of the disclosure.
Figure 7B:
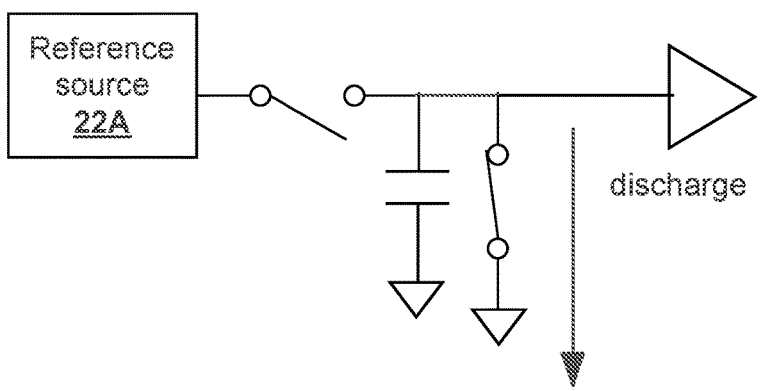
Figure 7C:
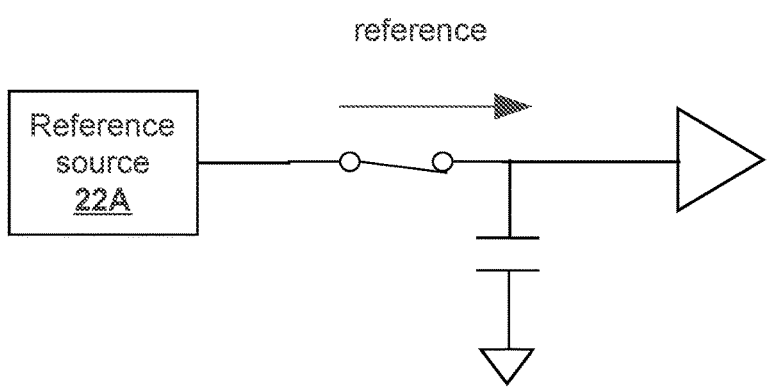

Referring again to FIG. 4 and to FIGS. 7A-7C, the sequence of operations in example voltage reference circuit 20B of FIG. 6 is illustrated. The timing diagram of FIG. 4 applies to the embodiment of voltage reference 20B shown in FIG. 6, as well as to the embodiment of voltage reference 20A shown in FIG. 3 as described above. Except for the coupling of voltage reference filter capacitor $C_{FILT}$ to the input of voltage reference buffer A2, rather than the output, the timing and sequence of switch control provided by switch control logic 24 of FIG. 3 may be applied to switch control logic 24A of FIG. 6. While voltage reference circuit 20B is in the disabled/power-down state, a pre-charge phase of operation is maintained, with switch $S_{PRE}$ enabled as illustrated by FIG. 7A, to charge voltage reference filter capacitor $C_{FILT}$ to the voltage of power supply $V_{PS}$ as illustrated in FIG. 6. As illustrated in FIG. 4, at time $T_1$, control signal Reference_en is asserted to enable reference buffer amplifier A2 and control signal prechrg_en is de-asserted to disconnect the pre-charge voltage source from voltage reference filter capacitor $C_{FILT}$ by opening switch $S_{PRE}$, which represents the transition between the pre-charge and discharge phases illustrated in FIG. 7A and FIG. 7B, respectively. Next, at time $T_2$, control signal dischrg_en is asserted to close switch $S_{DIS}$ to reduce the magnitude of the voltage on voltage reference filter capacitor $C_{FILT}$ (shown as the value in FILTP in FIG. 4) from Vdd1p8, which is an example (1.8V) of the voltage of $V_{PS}$ in FIG. 6 to an example value of 1.6V at time $T_3$, which is the discharge phase illustrated in FIG. 7B. When the voltage across voltage reference filter capacitor $C_{FILT}$ falls at time $T_3$, to the 1.6V, which is the example target voltage determined by threshold voltage $V_{TH}$=1.6V, the state of the output comp_out of comparator K1 changes, causing the discharge period to end at time $T_4$ by de-asserting control signal dischrg_en. At time $T_5$, control signal qchrg2_en is asserted, which couples the output of voltage reference source 22A through resistor $R_{FILT}$ to voltage reference filter capacitor $C_{FILT}$ as illustrated in the reference phase shown in FIG. 7C, and which charges voltage reference filter capacitor $C_{FILT}$ to reference voltage $V_{REF}$. At time $T_6$, control signal qchrg2_en is de-asserted, disconnecting reference buffer amplifier A2 from voltage reference filter capacitor $C_{FILT}$, which removes any noise from voltage reference source 22A that might otherwise be integrated on voltage reference filter capacitor $C_{FILT}$ and thus appear on output $V_{REF}$ of voltage reference 20B.

After the voltage on voltage reference filter capacitor $C_{FILT}$, buffered by amplifier A2, has been applied to the reference in ADC integrated circuit 10, it is necessary to pre-charge voltage reference filter capacitor $C_{FILT}$ again, or disable voltage reference 20B, depending on the next operation to be performed. The right-hand side of FIG. 4 illustrates a power-down sequence, in which at time $T_7$, control signal Reference_en is de-asserted to disable reference buffer amplifier A1 and control signal discharge_en is asserted to begin another discharge phase as illustrated in FIG. 5B. The discharge phase discharges voltage reference filter capacitor $C_{FILT}$ to a voltage lower than the lowest specified voltage of power supply rail $V_{PS}$, so that voltage reference filter capacitor $C_{FILT}$ cannot back-feed power supply rail $V_{PS}$ when the pre-charge phase is entered again. At time $T_8$, comparator K1 detects that the voltage across voltage reference filter capacitor $C_{FILT}$ has fallen below $V_{TH}$, asserting control signal comp_out, which then causes switch control logic 24 to de-assert control signal dischrg_en at time $T_9$ and then assert control signal prechrg_en at time $T_{10}$. Assertion of prechrg_en starts another pre-charge phase as illustrated in FIG. 5A which then begins pre-charge of voltage reference filter capacitor $C_{FILT}$ to the voltage of power supply $V_{PS}$ (1.8V), so that until the next conversion is initiated, voltage reference circuit 20B remains in the power-down state.

In summary, this disclosure shows and describes power-managed voltage reference circuits and methods that may be implemented with a class A reference buffer while overcoming voltage droop due to filter capacitor dielectric absorption, and in which back-feed of current into other circuits when the voltage reference is disabled is prevented. The voltage reference circuit comprises a voltage reference source, a voltage reference filter capacitor, a voltage reference buffer coupled to voltage reference source, wherein the voltage reference buffer operates in a normal power state and has a selectable low power state responsive to a control signal that selects between the normal power state and the low power state, a comparator for comparing a voltage across the voltage reference filter capacitor to a threshold voltage, and a switching circuit responsive to the output of the comparator and to the control signal, wherein the switching circuit selectively couples a first terminal of the voltage reference filter capacitor to the voltage reference buffer when the normal power state is selected. The second terminal of the voltage reference filter capacitor is coupled to a return current path, e.g., ground. The switching circuit, when the low power state is selected, selectively couples the first terminal of the voltage reference filter capacitor to a pre-charge source having a voltage approximately equal to a target reference voltage of the voltage reference, and the switching circuit, responsive to the control signal transitioning from the low power state to the normal power state, decouples the pre-charge source from the first terminal of the voltage reference filter capacitor and couples the first terminal of the voltage reference filter capacitor to a discharge path. The switching circuit, responsive to the output of the comparator indicating that a magnitude of the voltage across the voltage reference filter capacitor is less than the threshold voltage, couples the voltage reference buffer to the first terminal of the voltage reference filter capacitor.

In some embodiments, the first terminal of the voltage reference filter capacitor is selectively coupled to an output of the voltage reference buffer, and in other alternative embodiments, the first terminal of the voltage reference filter capacitor is selectively coupled to an input of the voltage reference buffer and the output of the voltage reference source. The pre-charge source may be a power supply and the switching circuit may, responsive to the control signal transitioning from the low power state to the normal power state, decouple the first terminal of the voltage reference filter capacitor from the voltage reference buffer and couple the voltage reference filter capacitor to a discharge path. The switching circuit may, responsive to the output of the comparator indicating that a magnitude of the voltage across the voltage reference filter capacitor is less than the threshold voltage, decouple the voltage reference filter capacitor from the discharge path and couple the first terminal of the voltage reference filter capacitor to the power supply to pre-charge the voltage reference filter capacitor to a voltage of the power supply. The voltage reference circuit may be a class A reference buffer and the threshold voltage may be a predetermined threshold voltage having a magnitude less than or equal to a minimum magnitude of a voltage of the output of the voltage reference when the voltage reference is in the normal power state. The threshold voltage may be the target reference voltage of the voltage reference and may be a predetermined threshold voltage having a magnitude less than or equal to a minimum magnitude of the voltage of the power supply.

While the disclosure has shown and described particular embodiments of the techniques disclosed herein, it will be understood by those skilled in the art that the foregoing and other changes in form, and details may be made therein without departing from the spirit and scope of the disclosure. For example, the techniques shown above may be applied in a voltage reference in an IC having an internal filter capacitor.

What is claimed is:

1. A method of initializing a voltage reference having a voltage reference filter capacitor, the method comprising:
    maintaining the voltage reference in a low power state, wherein an output of the voltage reference is disabled;
    while the voltage reference is in the low power state, maintaining a voltage across the voltage reference filter capacitor in a pre-charged state from a pre-charge source selectively coupled to a first terminal of the voltage reference filter capacitor, wherein the voltage maintained is approximately equal to a target reference voltage of the voltage reference, and wherein a second terminal of the voltage reference filter capacitor is coupled to a return current path;
    responsive to an indication to transition the voltage reference to a normal power state, decoupling the pre-charge source from the voltage reference filter capacitor, enabling the voltage reference and coupling the first terminal of the voltage reference filter capacitor to a discharge path;
    comparing a voltage across the voltage reference filter capacitor to a threshold voltage to determine whether or not a magnitude of the voltage across the voltage reference filter capacitor is less than the threshold voltage; and
    responsive to the comparing determining that the magnitude of the voltage across the voltage reference filter capacitor is less than the threshold voltage, coupling the voltage reference to the first terminal of the voltage reference filter capacitor.

2. The method of claim 1, wherein the coupling the voltage reference buffer to the first terminal of the voltage reference filter capacitor comprises coupling the output of the voltage reference buffer to the first terminal of the voltage reference filter capacitor, and wherein the maintaining the voltage across the voltage reference filter capacitor in a pre-charged state from a pre-charge source further comprises de-coupling the first terminal of the voltage reference filter capacitor from the output of the voltage reference buffer.

3. The method of claim 1, wherein the voltage reference comprises a voltage reference source having an input coupled to an input of a voltage reference buffer, wherein an output of the voltage reference buffer provides the output of the voltage reference, and wherein the coupling the voltage reference buffer to the first terminal of the voltage reference filter capacitor comprises coupling the output of the voltage reference source and the input of the voltage reference buffer to the first terminal of the voltage reference filter capacitor.

4. The method of claim 1, wherein the pre-charge source is a power supply, and wherein the maintaining the voltage across the voltage reference filter capacitor in the pre-charged state is performed by coupling the power supply to the first terminal of the voltage reference filter capacitor to pre-charge the voltage reference filter capacitor to a voltage of the power supply.

5. The method of claim 1, further comprising:
    responsive to an indication to transition the voltage reference to a low power state, disabling the voltage reference and coupling the first terminal of the voltage reference filter capacitor to a discharge path;
    comparing a voltage across the voltage reference filter capacitor to a predetermined threshold having a magnitude less than a minimum magnitude of the voltage of the power supply to determine whether or not a magnitude of the voltage across the voltage reference filter capacitor is less than the predetermined threshold; and
    responsive to the comparing determining that the voltage across the voltage reference filter capacitor is less than the predetermined threshold, decoupling the first terminal of the voltage reference filter capacitor from the discharge path, and coupling the first terminal of the voltage reference filter capacitor to the power supply to pre-charge the voltage reference filter capacitor to a voltage of the power supply.

6. The method of claim 1, wherein the voltage reference output is provided by a class A reference buffer.

7. The method of claim 1, wherein the threshold voltage is a predetermined threshold voltage having a magnitude less than or equal to a minimum magnitude of a voltage of the output of the voltage reference when the voltage reference is in the normal power state.

8. The method of claim 1, wherein the threshold voltage is the target reference voltage of the voltage reference.

9. A method of power managing a voltage reference having a voltage reference filter capacitor, the method comprising:
    responsive to an indication to transition the voltage reference to a low power state, disabling the voltage reference and coupling a first terminal of the voltage reference filter capacitor to a discharge path, wherein a second terminal of the voltage reference filter capacitor is coupled to a return current path;
    comparing a voltage across the voltage reference filter capacitor to a predetermined threshold having a magnitude less than a minimum magnitude of the voltage of the power supply to determine whether or not the voltage across the voltage reference filter capacitor is greater than the predetermined threshold; and responsive to the comparing determining that the voltage across the voltage reference filter capacitor is less than the predetermined threshold, decoupling the first terminal of the voltage reference filter capacitor from the discharge path, and coupling the first terminal of the voltage reference filter capacitor to the power supply to pre-charge the voltage reference filter capacitor to a voltage of the power supply.

10. The method of claim 9, wherein the voltage reference output is provided by a class A reference buffer.

11. The method of claim 9, wherein the threshold voltage is a predetermined threshold voltage having a magnitude less than or equal to a minimum magnitude of the voltage of the power supply.

12. The method of claim 9, wherein the threshold voltage is the voltage of the power supply.

13. A voltage reference circuit, comprising:
a voltage reference source;
a voltage reference filter capacitor;
a voltage reference buffer having an input coupled to an output of the voltage reference source, wherein the voltage reference buffer operates in a normal power state and has a selectable low power state responsive to a control signal that selects between the normal power state and the low power state;
a comparator for comparing a voltage across the voltage reference filter capacitor to a threshold voltage; and
a switching circuit responsive to the output of the comparator and to the control signal, wherein the switching circuit selectively couples a first terminal of the voltage reference filter capacitor to the voltage reference buffer when the normal power state is selected, wherein a second terminal of the voltage reference filter capacitor is coupled to a return current path wherein the switching circuit, when the low power state is selected, selectively couples the first terminal of the voltage reference filter capacitor to a pre-charge source having a voltage approximately equal to a target reference voltage of the voltage reference, wherein the switching circuit, responsive to the control signal transitioning from the low power state to the normal power state, decouples the pre-charge source from the first terminal of the voltage reference filter capacitor and couples the first terminal of the voltage reference filter capacitor to a discharge path, and wherein the switching circuit, responsive to the output of the comparator indicating that a magnitude of the voltage across the voltage reference filter capacitor is less than the threshold voltage, couples the voltage reference to the first terminal of the voltage reference filter capacitor.

14. The voltage reference circuit of claim 13, wherein the switching circuit, responsive to the output of the comparator indicating that a magnitude of the voltage across the voltage reference filter capacitor is less than the threshold voltage, couples the output of the voltage reference buffer to the first terminal of the voltage reference filter capacitor.

15. The voltage reference circuit of claim 13, wherein the switching circuit, responsive to the output of the comparator indicating that a magnitude of the voltage across the voltage reference filter capacitor is less than the threshold voltage, couples the input of the voltage reference buffer and the output of the voltage reference source to the first terminal of the voltage reference filter capacitor.

16. The voltage reference circuit of claim 13, wherein the pre-charge source is a power supply.

17. The voltage reference circuit of claim 16, wherein the switching circuit, responsive to the control signal transitioning from the low power state to the normal power state, decouples the first terminal of the voltage reference filter capacitor from the voltage reference buffer and couples the first terminal of the voltage reference filter capacitor to a discharge path, and wherein the switching circuit, responsive to the output of the comparator indicating that a magnitude of the voltage across the voltage reference filter capacitor is less than the threshold voltage, decouples the first terminal of the voltage reference filter capacitor from the discharge path and couples the first terminal of the voltage reference filter capacitor to the power supply to pre-charge the voltage reference filter capacitor to a voltage of the power supply.

18. The voltage reference circuit of claim 13, wherein the voltage reference output is a class A reference buffer.

19. The voltage reference circuit of claim 13, wherein the threshold voltage is a predetermined threshold voltage having a magnitude less than or equal to a minimum magnitude of a voltage of the output of the voltage reference when the voltage reference is in the normal power state.

20. The voltage reference circuit of claim 13, wherein the threshold voltage is the target reference voltage of the voltage reference.

21. A voltage reference circuit, comprising:
a voltage reference source;
a voltage reference filter capacitor;
a voltage reference buffer having an input coupled to an output of the voltage reference source, wherein the voltage reference buffer operates in a normal power state and has a selectable low power state responsive to a control signal that selects between the normal power state and the low power state;
a comparator for comparing a voltage across the voltage reference filter capacitor to a threshold voltage;
a switching circuit responsive to an output of the comparator and to the control signal, wherein the switching circuit, responsive to the control signal transitioning from the low power state to the normal power state, decouples a first terminal of the voltage reference filter capacitor from the voltage reference buffer and couples the first terminal of the voltage reference filter capacitor to a discharge path, wherein a second terminal of the voltage reference filter capacitor is coupled to a return current path, and wherein the switching circuit, responsive to the output of the comparator indicating that a magnitude of the voltage across the voltage reference filter capacitor is less than the threshold voltage, decouples the first terminal of the voltage reference filter capacitor from the discharge path and couples the first terminal of the voltage reference filter capacitor to the power supply to pre-charge the voltage reference filter capacitor to a voltage of the power supply.

22. The voltage reference circuit of claim 21, wherein the voltage reference buffer is a class A reference buffer.

23. The voltage reference circuit of claim 21, wherein the threshold voltage is a predetermined threshold voltage having a magnitude less than or equal to a minimum magnitude of the voltage of the power supply.

24. The voltage reference circuit of claim 21, wherein the threshold voltage is the voltage of the power supply.

* * * * *

UNITED STATES PATENT AND TRADEMARK OFFICE
CERTIFICATE OF CORRECTION

PATENT NO. : 11,231,732 B1
APPLICATION NO. : 16/922654
DATED : January 25, 2022
INVENTOR(S) : Prakash et al.

It is certified that error appears in the above-identified patent and that said Letters Patent is hereby corrected as shown below:

In the Specification

In Column 5, Line 34, delete "CHET" and insert -- $C_{FILT}$ --, therefor.

Signed and Sealed this
Twenty-sixth Day of April, 2022

Katherine Kelly Vidal
*Director of the United States Patent and Trademark Office*